United States Patent
Catino

(10) Patent No.: US 8,387,923 B2
(45) Date of Patent: Mar. 5, 2013

(54) METHOD FOR INCREASING THE LIFT OF AERODYNAMIC SURFACES AND FOR REDUCING THE DRAG

(75) Inventor: Nicola Italo Catino, Rivoli (IT)

(73) Assignee: Alenia Aeronautica S.p.A., Pomigliano D'Arco, Naples (IT)

( * ) Notice: Subject to any disclaimer, the term of this patent is extended or adjusted under 35 U.S.C. 154(b) by 322 days.

(21) Appl. No.: 12/667,221

(22) PCT Filed: Mar. 10, 2008

(86) PCT No.: PCT/IB2008/050867
§ 371 (c)(1),
(2), (4) Date: Dec. 29, 2009

(87) PCT Pub. No.: WO2009/004499
PCT Pub. Date: Jan. 8, 2009

(65) Prior Publication Data
US 2010/0181433 A1    Jul. 22, 2010

(30) Foreign Application Priority Data
Jun. 29, 2007   (IT) .............................. TO2007A0468

(51) Int. Cl.
*B64C 21/08* (2006.01)
(52) U.S. Cl. ...................................... 244/208; 244/207

(58) Field of Classification Search .................. 244/207, 244/208
See application file for complete search history.

(56) References Cited

U.S. PATENT DOCUMENTS

| 2,585,676 | A | 2/1952 | Poisson-Quinton |
| 2,890,843 | A | 6/1959 | Attinello |
| 4,641,799 | A | 2/1987 | Quast et al. |
| 6,267,331 | B1 * | 7/2001 | Wygnanski et al. .......... 244/204 |
| 2010/0044520 | A1 * | 2/2010 | Gaster ........................... 244/208 |
| 2010/0229952 | A1 * | 9/2010 | Smith et al. ...................... 137/1 |

FOREIGN PATENT DOCUMENTS

| DE | 1 165 419 B | 3/1964 |
| WO | WO 91/19776 | 7/1991 |

\* cited by examiner

*Primary Examiner* — Timothy D Collins
*Assistant Examiner* — Jamie S Stehle
(74) *Attorney, Agent, or Firm* — Merchant & Gould P.C.

(57) ABSTRACT

A jet of air is impelled on to the upper surface of a flap in order to increase its lift. Part of the air in this air jet is drawn, through air intakes, from the air stream flowing over an upper surface of the fixed part of the wing, located upstream of the flap. The air jet drawn in by suction by the air intakes is reinforced by a jet of compressed air blown through a passage which opens immediately downstream of the air intakes. This creates a combined jet of the air sucked in and the blown jet, which is ejected on to the upper surface of the flap through outlet apertures located on the rear edge of the fixed part of the wing.

10 Claims, 3 Drawing Sheets

180# METHOD FOR INCREASING THE LIFT OF AERODYNAMIC SURFACES AND FOR REDUCING THE DRAG

This application is a National Stage Application of PCT/IB2008/050867, filed 10 Mar. 2008, which claims benefit of Serial Number TO2007A000468, filed 29 Jun. 2007 in Italy and which applications are incorporated herein by reference. To the extent appropriate, a claim of priority is made to each of the above disclosed applications.

BACKGROUND OF THE INVENTION

The present invention relates to a method for increasing the lift of an aerodynamic surface of an aircraft and for reducing the drag of an aerodynamic surface on a ground vehicle. The invention has been devised for application, in particular, to the wings of aircraft, as the following description will make clear, but the invention can also be used to improve the aerodynamic efficiency of an aircraft in general or that of a ground vehicle.

When taking off and landing, modern aircraft require a capacity for increased lift, in other words the possibility of enhancing the normal capacity of the wings to keep the aircraft flying at the reduced speed at which they operate in these conditions. This effect is typically obtained by the downward deflection of the flaps.

In the past, it has been proposed that air at high pressure should be drawn from the jet engine and blown at supersonic velocity on to the upper surfaces of the flaps through a passage running along the rear edge of the fixed part of the wing, in order to increase the efficiency of the increased lift devices in fighter aircraft. The energy supply created by this jet of air retards the loss of vacuum which occurs on the upper surfaces of the flaps when the reduced flight velocity makes the air stream flowing over the wing tend to break away from the wing, causing a loss of lift.

The use of this method, as applied in the past, is not possible in more modern aircraft, particularly civil aircraft, whose jet engines cannot supply the requisite quantity of pressurized air. This limitation is inherent in the method, since it requires the use of a blowing velocity well above the speed of sound, which would require very large amounts of air, especially because the wing area of modern aircraft, whether military or civil, is very large. In any case, the air flow provided in this way would be insufficient for large aircraft.

As an alternative, the compressed air could be supplied by a suitable compressor, but this would entail an unacceptable increase in cost, weight and energy consumption.

SUMMARY OF THE INVENTION

The object of the present invention is therefore to propose a substantially improved method which can be used not only to increase the lift of an aerodynamic surface of an aircraft but also to reduce the drag of a ground vehicle.

Briefly, a jet of air is impelled on to the upper surface of a flap in order to increase its lift. According to the invention, at least part of the air in this jet is drawn, through air intakes, from the air stream flowing over an upper surface of the fixed part of the wing, upstream of the flap. This jet is also used to suck in fluid streams upstream of a blowing duct. In the preferred and most effective embodiment of the invention, the air jet drawn by suction from the air intakes is used to increase the effect of a jet of compressed air blown through a blowing passage which opens above the upper surface of the fixed part of the wing, immediately downstream of the suction air intakes. This creates a combined jet, comprising the air sucked in and the blown jet, which is directed towards outlet apertures located on the rear edge of the fixed part of the wing, and is ejected on to the upper surface of the flap.

BRIEF DESCRIPTION OF THE DRAWINGS

A preferred, but non-limiting, embodiment of the invention will now be described. Reference is made to the attached drawings, in which.

DETAILED DESCRIPTION OF THE PREFERRED EMBODIMENTS

Figure 1:
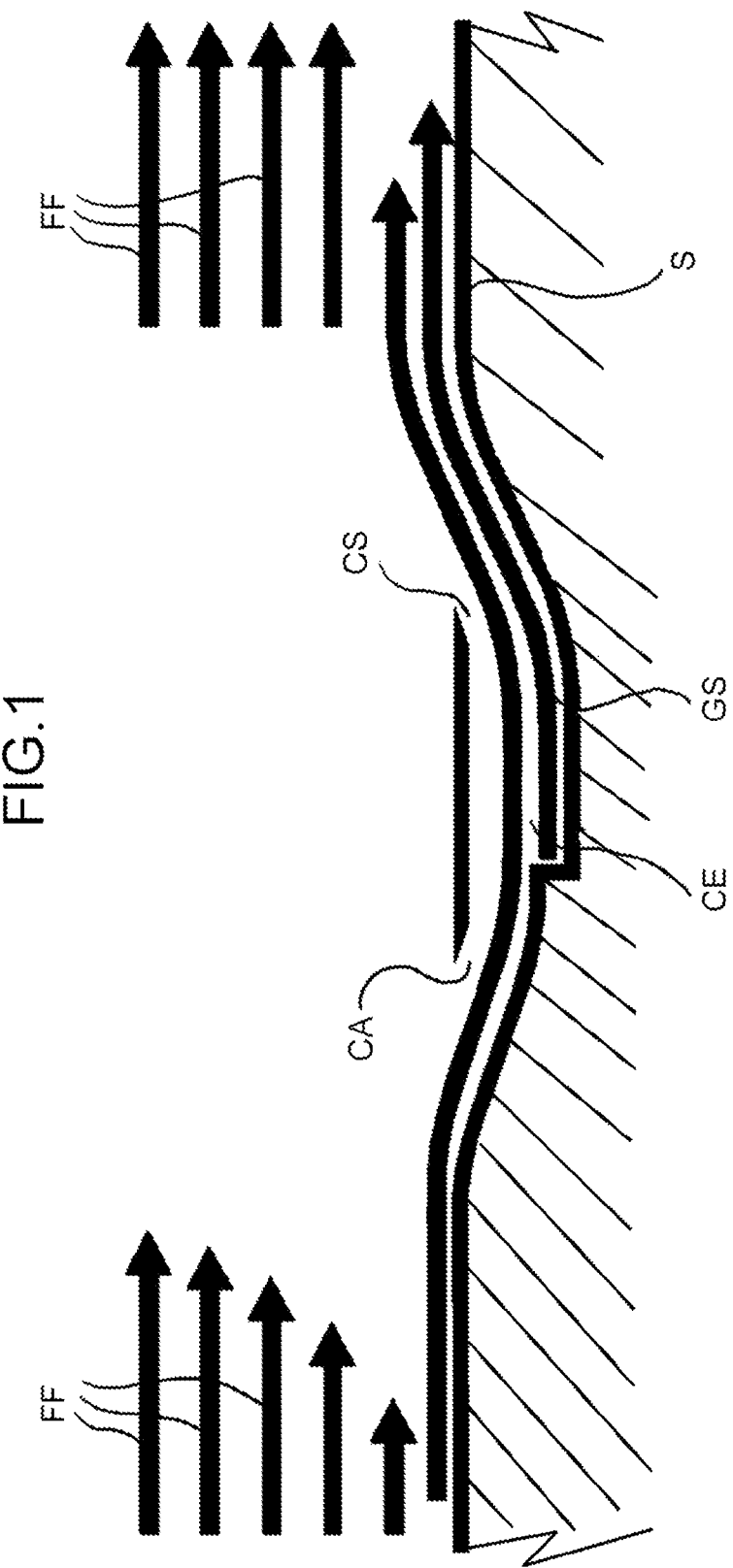
FIG. 1 is a section which schematically represents the method according to the invention.

Reference is initially made to FIG. 1, which is a schematic representation of the fundamental principle of the present invention. S is a surface of a solid body which is moving relative to a liquid or gaseous medium, in which the body is immersed. The layers of the fluid closest to the surface of the body are called fluid streams, indicated by FF. The characteristics of the fluid streams determine the development of the forces acting on the moving body. In particular, the fluid streams generate a force which opposes the advance of the body within the fluid medium, this force being called drag, and, if the body is of a suitable shape such as the wings of an aircraft, generate a force perpendicular to the direction of advance of the object, called the lift force. While the drag force opposes the movement of vehicles, aircraft and vessels, the lift force mainly acts on aircraft and the sails of vessels. In certain conditions, the fluid streams tend to break away from the surface over which they flow; in such a case, the drag greatly increases and the lift capacity of wings and sails is severely compromised. The invention makes it possible to control the fluid streams in contact with the solid wall of the moving body, thus reducing the possibility of their breaking away from the surfaces, and consequently improving the capacity to generate what is known as the lift force and reducing the drag. The control of the fluid streams is provided by means of the combined effect of the suction of the fluid streams under the surface S of the moving body (through a suction passage CA or an aperture or perforated surface or air intake of the NACA type, as described below) and the simultaneous presence of a blown fluid jet GS downstream of the suction point and parallel to the surface of the solid body.

The suction passage CA enables fluid streams to enter an ejector channel or passage CE which runs perpendicularly to the direction of the fluid streams. The ejector channel communicates with the outside through a blowing passage CS. Preferably, a blown jet GS (of air or of any fluid), having a velocity greater than that of the fluid streams, is injected into the ejector channel so that it emerges from the blowing passage. Because of friction, the blown jet GS draws the fluid streams through the suction passage and carries them with it through the blowing passage. Thus a final blown jet emerges from the blowing passage and flows over the surface S, so as to energize the fluid streams downstream of the blowing passage.

Figure 2:
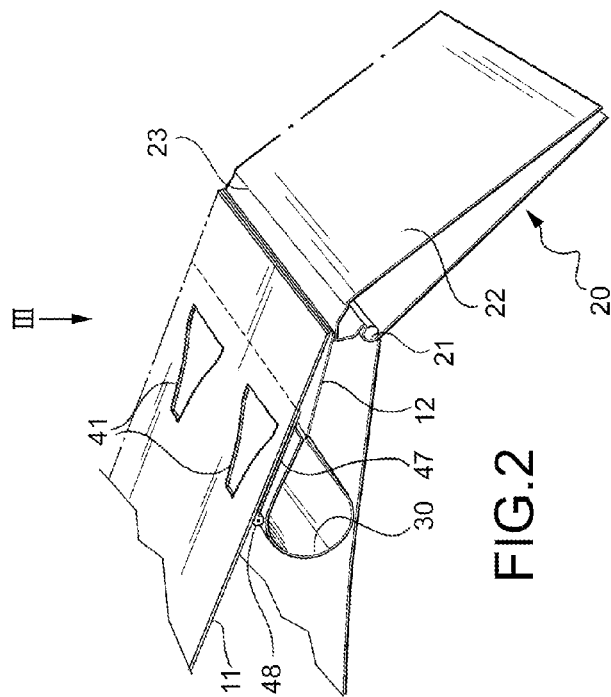
FIG. 2 is a sectional perspective view of the rear part of the wing of an aircraft according to the invention.
Figure 3:
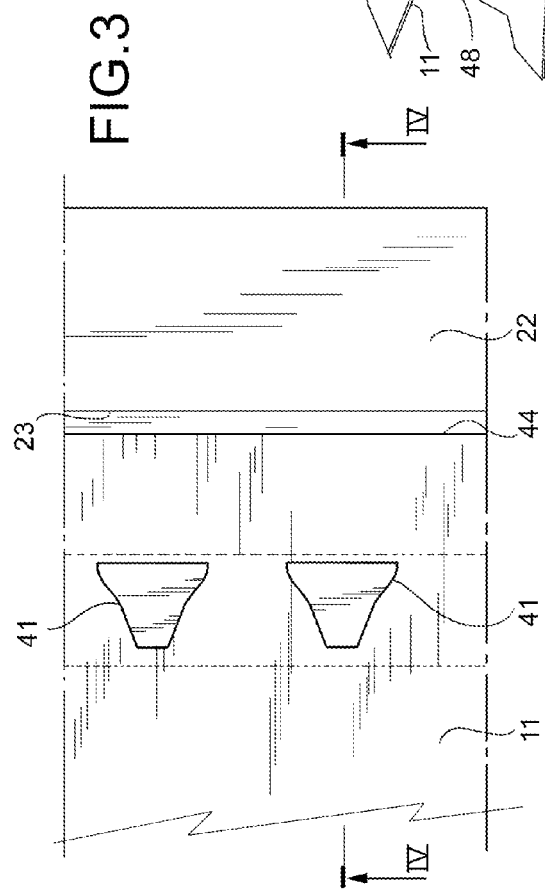
FIG. 3 is a plan view from above taken in the direction of the arrow III in FIG. 2.
Figure 4:
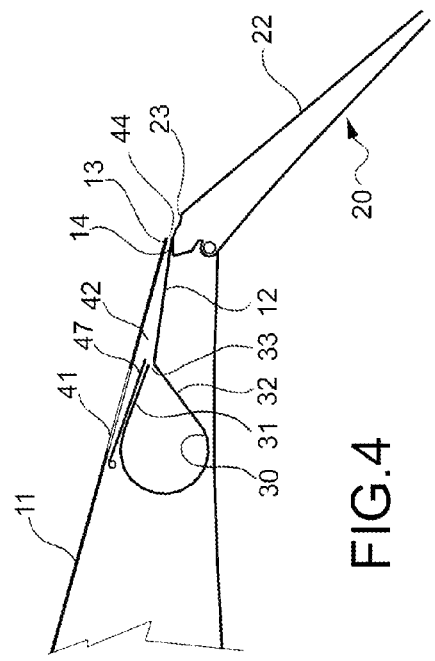
FIG. 4 is a view in vertical section along the line IV in FIG. 3.

With reference now to FIGS. 2-4, an aircraft wing comprises a main fixed part 10 of the wing with an upper panel 11 and a flap 20 hinged to the rear of the fixed part 10 of the wing along a transverse shaft 21. Throughout the present description and the claims, the terms and expressions indicating positions and orientations, such as "rear" or "transverse", are considered to refer to the direction of advance of an aircraft or vehicle and to the condition in which the device is installed on it.

A passage 30 for the compressed air drawn from one of the low-pressure stages of the compressor (not shown) and/or from the by-pass passage (not shown) of a turbofan jet engine is provided in the fixed part 10 of the wing, at a certain distance from the rear terminal edge of the wing. The passage 30 runs transversely along the wing and preferably has a cross section of teardrop shape, with a pair of walls 31 and 32 which converge towards the rear to form a narrow rear slit 33 which is transversely elongated and acts as an ejector nozzle, as explained below. The ejector nozzle 33 opens immediately above an intermediate panel 12 which is placed under the upper panel 11 and is separated therefrom.

The panels 11 and 12 form between them a space 42 which terminates at the rear in a transversely elongated narrow outlet aperture 44 which is formed by the rear edges 13 and 14 of the panels 11 and 12. Preferably, the panels 11 and 12 converge towards the rear, causing the space 42 to be tapered vertically towards the rear in order to increase the acceleration of the air jet which emerges from the aperture 44.

An array of air intakes 41, transversely spaced apart from each other at predetermined intervals, is formed in the upper panel 11. The air intakes 41 are formed immediately upstream of the ejector nozzle 33. In the preferred embodiment shown in the drawings, the air intakes 41 are intakes of the known type called "NACA", having a bell-shaped profile, as shown in FIG. 3. Alternatively, in less preferred embodiments (not shown), the air intakes 41 can be, for example, slots or apertures of different shapes. The NACA air intakes are advantageous because of their capacity to capture and suck in a considerable quantity of air, creating negligible drag losses.

The operation of the wing shown in FIGS. 2-4 is as follows. The compressed air impelled at sonic velocity through the passage 30 is accelerated between the converging parts 31 and 32, and emerges at high velocity from the ejector nozzle 33, thus injecting an air jet, referred to herein as the "blown" jet, into the space 42. Because of what is called the ejector effect, this blown jet at high velocity draws in more air through the NACA intakes 41. The total air injected into the space 42 therefore originates partly from the jet blown from the ejector nozzle 33 and partly from the suction through the NACA intakes 41 of the boundary layer of the stream flowing along the upper surface of the panel 11 upstream of these air intakes. This creates a combined jet of compressed air (blown and sucked in) which is ejected from the outlet aperture 44 on the upper surface 22 of the flap. This combined jet counteracts the breakaway of the fluids from the upper surface of the flap, and thus compensates for the loss of vacuum, and therefore of lift, due to the low relative velocity of the stream flowing over the wing during take-off and landing.

Simulation tests conducted by the Applicant have demonstrated that, even in the absence of a compressed air jet flowing through the passage 30, there is a degree of increase in lift, even if this is of limited extent, due solely to the suction through the NACA apertures. These apertures always suck in the boundary layer from the upper surface of the wing, thus ensuring a minimum increase in lift even if there is an engine failure.

Figure 5:
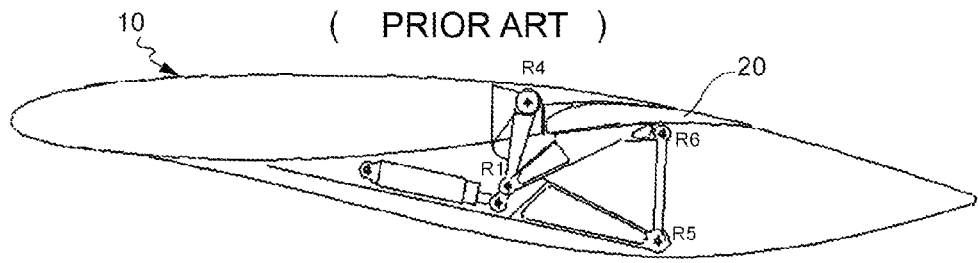
FIGS. 5 and 6 are schematic views in vertical section of a conventional actuating device for the flap of an aircraft wing.
Figure 6:
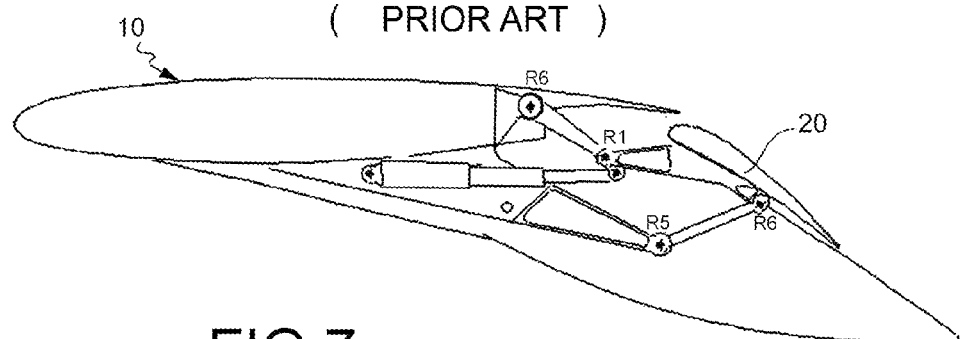
Figure 7:
FIGS. 7 to 10 are schematic views in vertical section of a flap actuating device which can be used according to the invention.
Figure 8:
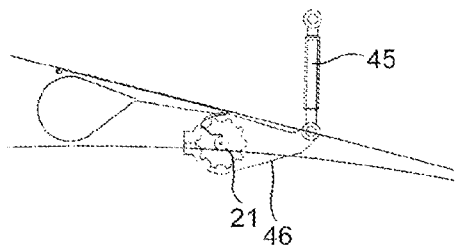
Figure 9:
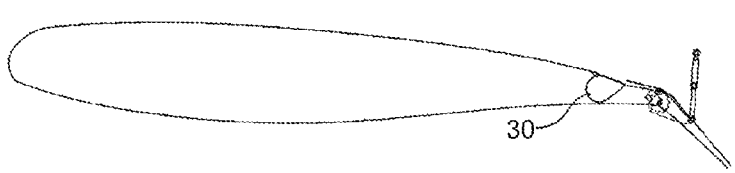
Figure 10:
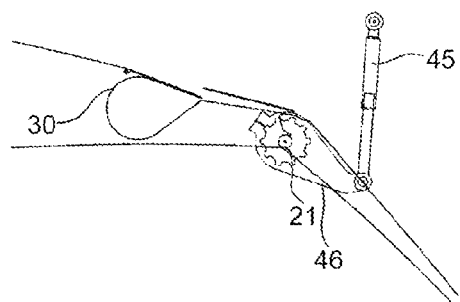

The increased lift also has the favourable effect of enabling the flap actuating mechanism to be simplified and permitting a reduction in the dimensions of the flap and of the fairing designed to house the actuating mechanism, as can be seen by comparing FIGS. 5 and 6 with FIGS. 7-10. A flap of the conventional type (FIGS. 5 and 6) is actuated by a rather complex mechanism which imparts a combined rotary and translational movement to the flap. According to the invention, because of the increased lift provided by the configuration described above, it is possible to produce a shorter flap 20 which is advantageously simply hinged to the fixed part of the wing (FIGS. 7-10). A jack 45 is provided to cause a torsion shaft 21 to rotate by means of a lever 46 in order to actuate the flap. This yields a reduction in weight and cost, and in the dimensions of the fairing (not shown) which contains the actuating mechanism, thus providing less aerodynamic resistance to the advance of the vehicle.

Returning to FIGS. 2 and 4, when the flap 20 is raised for flight at cruising velocity, an upper rear edge 23 of the flap blocks the outlet 44 of the combined jet of compressed, blown and sucked air. To prevent the air intakes 41 and the space 42 from being blocked by dirt during flight when the outlet 44 is closed, it is preferable to provide a cover 47, hinged under the upper panel 11 at 48, to close the air intakes 41 when increased lift is not required. The raising and lowering movements of the cover 47, which correspond, respectively, to the closing and opening of the air intakes 41, can advantageously be coordinated or simultaneous with the raising and lowering movements of the flaps.

The invention can be applied with particular benefit to jet aircraft with high by-pass engines of any type, whether civil or military, which require a capacity for increased lift. The invention may be particularly advantageous in supersonic aircraft having very thin wings where the use of conventional increased lift surfaces is very restricted.

As stated previously, the invention makes it possible to prevent the fluid streams from breaking away from the rear surface on to which the supplementary air jet is ejected. One effect of this is a decrease in drag. This effect enables the invention to be used on ground vehicles also, in order to reduce their aerodynamic drag.

It is to be understood that the invention is not limited to the embodiment described and illustrated herein, which is to be considered as an example of embodiment; the invention is applicable to any fluid (gaseous or liquid) and can be modified in respect of the form and arrangements of parts and details of construction, and in respect of its operation. For example, the air intakes 41 could be formed in an additional panel (not shown) fixed above the upper panel 11 of the wing.

The invention claimed is:

1. A method for increasing the lift of an aerodynamic surface of an aircraft or for reducing the aerodynamic drag of a ground vehicle, wherein the surface is a second surface positioned downstream of a first surface of a transversely elongated panel located upstream with respect to the direction of an air stream flowing over the first surface towards the second surface, the panel having a plurality of air intakes formed in the first surface of the panel and spaced apart from each other transversely at predetermined intervals, the air intakes having associated covers pivotally mounted to move between an open position and a closed position; the method comprising:

sending a supplementary air jet on to the second surface in a direction substantially identical to the direction of the air stream, wherein at least part of the supplementary air jet is sucked in by the air stream which flows over the first surface; and moving the covers to the open position and drawing the at least part of the supplementary air jet through the plurality of air intakes formed in the first surface of the transversely elongated panel, the air intakes having capacity to capture and suck in a considerable quantity of air from the air stream flowing over the first surface.

2. A method according to claim 1, wherein a pressurized air jet is impelled at high velocity near to or immediately downstream of the air intakes which can capture air from the air stream which flows over the first surface, wherein the pressurized air jet draws air from the outside through the air intakes.

3. A method according to claim 2, wherein compressed air is drawn, in a jet-engine aircraft, from one of the low-pressure stages of a compressor or from a by-pass passage of a jet engine, and the drawn in compressed air is injected into a passage having converging inner walls in such a way that the compressed air is accelerated towards at least one ejector aperture or nozzle positioned near the air intakes or immediately downstream of the intakes, producing the pressurized air jet which draws in air from the outside through the air intakes.

4. A method according to claim 2, wherein the pressurized air is impelled at sonic velocity.

5. An aircraft wing comprising a main fixed wing part with an upper surface and at least one movable rear flap with an upper surface, comprising:

means for impelling a supplementary air jet on to an upper surface of the flap in a direction substantially identical to the direction of an air stream flowing over the upper surface of the fixed part of the wing, a transversely elongated panel which forms at least part of the upper surface of the fixed part of the wing and which extends to a proximity of a rear terminal edge of the upper surface of the fixed part of the wing, a plurality of air intakes distributed transversely along the upper surface of the fixed part of the wing, formed in the transversely elongated panel and spaced apart from each other transversely at predetermined intervals, the air intakes having the capacity to capture and suck in a considerable quantity of air from the stream which flows over the upper surface of the fixed part of the wing, a plurality of pivotally mounted covers associated with the air intakes to close or open the air intakes; and one or more rear outlet apertures located near rear edge areas of the fixed wing part, the rear outlet apertures receiving air captured by the air intakes and ejecting on to the upper surface of the at least one flap.

6. An aircraft wing according to claim 5, wherein the air intakes are NACA intakes having a bell-shaped profile with its wider part towards the rear.

7. An aircraft wing according to claim 5, wherein the flap has a front upper edge which can block the outlet apertures when the flap is raised into a flight position in which the upper surfaces of the fixed wing part and of the flap are substantially coplanar.

8. An aircraft wing according to claim 5, further comprising a passage for pressurized air which runs transversely along the wing and has one or more backward facing ejector nozzles which open near to or immediately downstream of the air intakes.

9. An aircraft wing according to claim 8, wherein the one or more ejector nozzles comprise one or more transversely elongated narrow slots.

10. An aircraft wing according to claim 8, wherein the passage has inner walls which converge towards the rear and towards the one or more ejector nozzles.

* * * * *